United States Patent [19]
Cruickshank

[11] Patent Number: 4,917,487
[45] Date of Patent: Apr. 17, 1990

[54] PROJECTION APPARATUS
[75] Inventor: John S. Cruickshank, Inchture, United Kingdom
[73] Assignee: L.B.P. Partnership, St. Louis, Mo.
[21] Appl. No.: 234,275
[22] Filed: Aug. 19, 1988
[30] Foreign Application Priority Data
  Oct. 20, 1987 [GB] United Kingdom ............... 8724527
[51] Int. Cl.⁴ ............................................. G03B 21/26
[52] U.S. Cl. ........................................ 353/28; 353/42; 353/46; 353/62
[58] Field of Search ................. 353/88, 28, 46, 48, 353/49, 97, 121, 122, 62; 356/2, 376, 380, 386, 387

[56] References Cited
U.S. PATENT DOCUMENTS

| | | |
|---|---|---|
| 891,013 | 6/1903 | Smith .......................... 33/1 R X |
| 1,382,978 | 6/1921 | Hopkins ....................... 33/1 R X |
| 1,514,138 | 11/1924 | Dahn ............................ 353/30 |
| 1,546,636 | 7/1925 | Engelmann . |
| 1,594,607 | 8/1926 | Engelmann . |
| 2,066,996 | 1/1937 | Morioka . |
| 2,163,124 | 6/1939 | Jeffreys et al. . |
| 2,163,125 | 6/1939 | Jeffreys et al. . |
| 2,335,127 | 11/1943 | Ling . |
| 3,085,923 | 4/1963 | Agnew . |
| 3,246,570 | 4/1966 | Nogradi et al. . |
| 3,546,377 | 6/1968 | Troll . |
| 3,624,371 | 11/1971 | Neal et al. . |
| 3,688,676 | 9/1972 | Cruickshank . |
| 3,690,242 | 9/1972 | Cruickshank . |
| 3,796,129 | 3/1974 | Cruickshank . |
| 3,866,052 | 2/1975 | Di Matteo et al. . |
| 3,884,577 | 5/1975 | Carpentier et al. . |
| 3,932,923 | 1/1976 | Di Matteo . |
| 3,969,577 | 7/1976 | Lloyd et al. . |
| 3,976,382 | 8/1976 | Westby . |
| 4,060,318 | 11/1977 | Hansford ........................ 353/42 |
| 4,202,612 | 5/1980 | DiMatteo ....................... 353/28 |
| 4,302,097 | 11/1981 | Chlestil . |
| 4,458,993 | 7/1984 | Kempf . |
| 4,472,056 | 9/1984 | Nakagawa et al. . |
| 4,491,868 | 1/1985 | Berridge Jr. et al. . |
| 4,509,075 | 4/1985 | Simms et al. . |
| 4,613,234 | 9/1986 | Cruickshank . |

FOREIGN PATENT DOCUMENTS
939261 10/1963 United Kingdom .
939262 10/1963 United Kingdom .

Primary Examiner—Harry N. Haroian
Attorney, Agent, or Firm—Ladas & Parry

[57] ABSTRACT

A projection apparatus has a strobed light source projecting light through a transparency, the transparency having one or preferably a plurality of narrow slits formed thereon so as to project a light pattern upon an object. The transparency is mounted in a holder which is arranged to be moved across the path of the light source by being mounted in a holder which is driven by a cam. The light source is arranged to be pulsed on when the holder is on a dwell point of the cam. If the transparency has a plurality of slits therein simultaneous display of multiple profiles on an object is performed to provide a large number of profiles in a minimal time span. In the disclosure, two different manners of driving the transparency in the holder are given.

14 Claims, 4 Drawing Sheets

PROJECTION APPARATUS

This invention relates to a projection apparatus for illuminating a plurality of profiles of an object.

Such an apparatus may be used, for example, in a three-dimensional scanner such as that disclosed in our co-pending U.S. patent application No. 234,251 which is incorporated herein by reference. In the said copending application, a beam scanning assembly is described comprising a laser projecting a light beam through a shutter which is then split and directed through respective line optics so that two narrow lines of light are formed which are transmitted onto respective sides of a rotatable, line-etched prism that is driven in a stepwise fashion by a stepping motor. The prism transmits a pair of light beams to both sides of a double-angled, line-etched light splitter so that the light is transmitted into two opposing paths for subsequent reflection onto an object. Thus in the assembly disclosed in the said co-pending application, an object has two, opposing, profiles thereof illuminated by the respective single narrow lines of light formed by the line optics so that re-entrant profiles may be illuminated. The scanner disclosed in our said co-pending application has apparatus for projecting one continuous line.

It is an object of this invention to provide a projection apparatus for illuminating a plurality of profiles of an object and which may be easily adapted in some embodiments thereof to provide the simultaneous display of multiple profiles.

According to this invention there is provided a projection apparatus for illuminating a plurality of profiles of an object, including radiant energy means adapted to project a beam of radiation through a slit aperture and moving means for moving said slit aperture across the path of said radiant energy means whereby differing portions of an object may be successively illuminated.

Preferably the slit aperture is provided on a transparency. Advantageously the radiant energy means is a light means, the transparency has a plurality of slit apertures provided thereon and said moving means moves said transparency with respect to the light means.

Conveniently the moving means comprises a holder for supporting said transparency and a rotatable cam having a plurality of different radial dwell positions thereon arranged to drive the slit aperture or apertures across the path of the light beam.

In one embodiment of the invention the holder is mounted on a pivot and arranged to be driven arcuately about said pivot by a cam follower engageable with said rotatable cam.

In another embodiment of the invention the holder is slidably mounted for transverse movement across the projected light beam and arranged to be driven in a reciprocle fashion by a cam follower engageable with said rotatable cam.

Advantageously in both said embodiments the light means is a strobe light source and a timing means is provided to ensure the strobe light source fires at each dwell position of said cam. Normally a camera is provided to record light profiles of an object illuminated by said light beam at each dwell position of said cam.

The present invention has the advantage that in one embodiment thereof a plurality of profiles are illuminated on an object and such an arrangement has the advantage that a moving object may have a large number of surface profiles illuminated in a minimum time span, i.e. where "freezing" of subject movement is extremely desirable. Such situations may arise in medical use where the subject suffers from uncontrollable movement due to trauma or disease and where it is required to make a true record of the subject. Additionally, in an industrial situation on a transfer line it may be desirable to freeze movement of an object to provide a large number of profiles in a minimal time span.

Advantageously, a plurality of said projection apparatuses are provided for circumferential location about an object and a sequencing means is provided for providing said radiant energy to each projection apparatus in a predetermined sequence.

The invention will now be described by way of example with reference to the accompanying drawings, in which FIG. 1 shows a partially cut-away side view of one embodiment of the apparatus in accordance with this invention, FIG. 2 shows a cam profile, used in the invention, to an enlarged scale, FIG. 3 shows a side view of the light paths projected by the apparatus of FIG. 1, FIG. 4 shows a partially cut-away side view of another embodiment of the apparatus in accordance with this invention.

In the figures, like reference numerals denote like parts.

Figure 1:
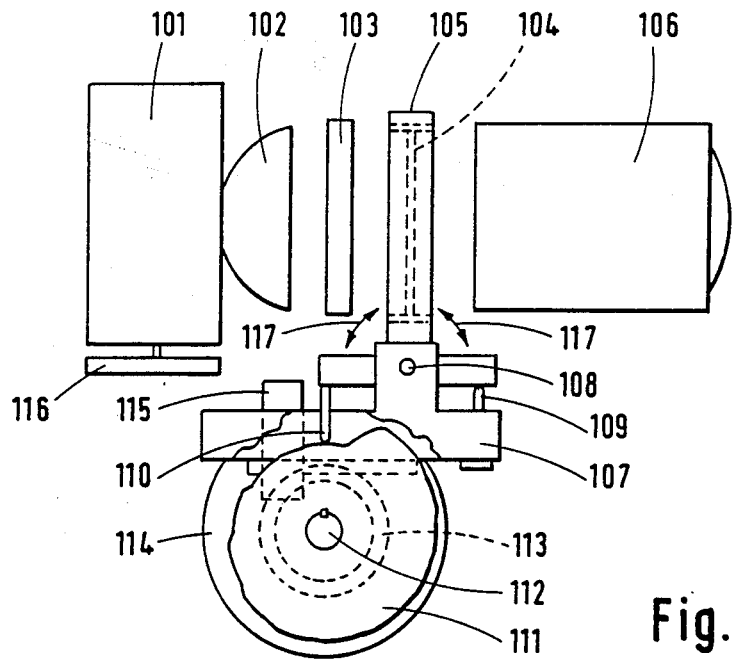

The projection apparatus shown in FIG. 1 has a strobed laser light source 101 having a reflector 102 and a clear, non-distorting, heat dissipating glass 103 which is required to prevent heat from the source 101 distorting a transparency 104 mounted in an inverted T-shaped holder 105. An alternative arrangement for removing heat generated by light source 101 could be a cooling fan (not shown) blowing air upon the transparency 104. A projector lens assembly 106 projects a line pattern formed upon transparency 104 upon an object (not shown). In this invention the line pattern of radiation projected onto an object may be in linear form, for example vertical or horizontal, or a grid pattern formed by vertical and horizontal scanning, or in another alternative a pattern of radial lines. Whatever pattern is required for projection, it is firstly drawn to a large scale, photographed and then reduced in size to a predetermined dimension such as that commensurate with a standard 35 mm slide transparency.

The inverted T-shaped holder 105 is pivotally located in a U-shaped base 107 having an inverted T-shaped cross-section. The mounting for the holder 105 is provided by a hardened pivot pin 108 mounted in wear-resistant bushings in opposed legs of the base 107. A spring loaded pin 109 extends through an arm of the base 107 to apply a turning force against an arm of the inverted T-shaped holder 105, the opposed arm of which is provided with a cam follower 110 located directly above the axis of a cam 111 mounted on a shaft 112.

The cam follower 110 is, when in a true vertical position, thus arranged to be directly over the centre line of the shaft 112. The cam is arranged to have a series of rise portions each interspersed by a like number of dwell portions so that the radius of the cam increases in a series of steps before dropping to return to the minimum radius position. The shaft 112 is keyed to the cam 111 and the shaft is driven by a constant speed electric motor 113.

The profile of the cam 111 is shown in an exagerated fashion for illustration purposes and in practice the radial difference between dwell heights would be, for example, 0.13 mm, depending on the movements of the projected pattern required. The shaft 112 is also arranged to carry a circular disk 114 having a hole (not shown) at a predetermined radius therein and a light sensor assembly 115 comprising a light emitting diode (LED) and a photodetector is positioned so that light from the LED is able to pass through the hole to be received by the photodetector. The disk 114 and light sensor assembly 115 act as a timing circuit so that when the hole in the disk 114 aligns with the light path between the LED and photodetector so a signal is produced to activate a controller 116 for the strobed light source 101 such that the light source fires at each dwell position of the cam 111 as is a camera (not shown) directed at the illuminated object profiles.

In operation, the motor 113 is run up to the selected speed and the LED of the light sensor assembly 115 is switched on to ensure correct phase control for the strobe light source controller 116. At each dwell position of the cam the pattern transparency 104 has been moved arcuately to a new position as indicated by the double arrow-headed lines 117 and at each position the light source is fired, the object illuminated and the profiles recorded on the camera.

To take as an example, a motor rotating at 60 r.p.m., a cam having twenty (20) dwell positions and a transparency defining 50 lines, in one second with only twenty camera shots there will be recorded 1,000 profiles defined by 1,000 slit apertures. Increasing the speed of the motor, the dwell on the cams or the number of slit apertures on the transparency will all increase the number of profiles illuminated. If required the apparatus will enable the provision of a slit aperture for processing every 0.00254 mm of an object surface in a linear (vertically or horizontally or in a grid) or radially patterned in dependence upon the pattern applied to the transparency.

Figure 2:
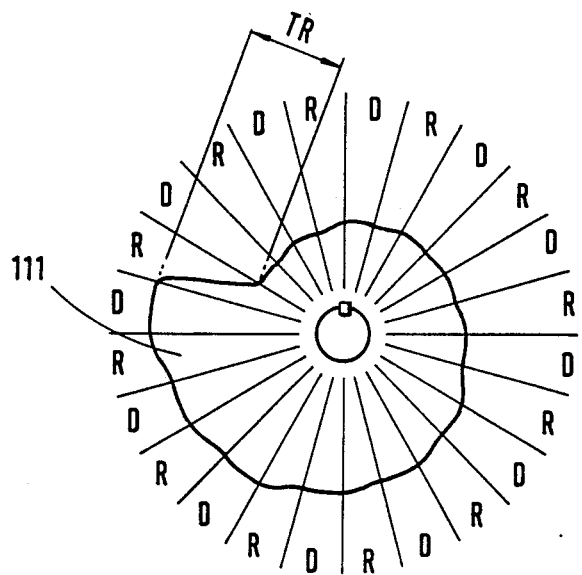
Figure 3:
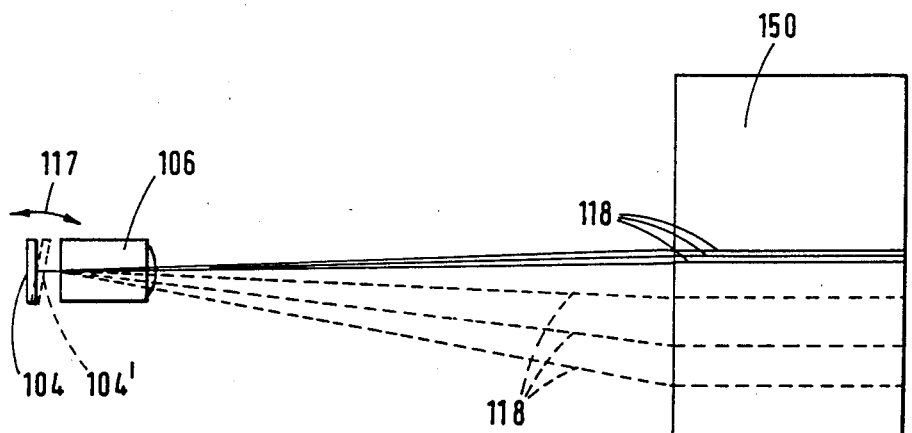

The cam profile is shown in an exaggerated fashion in FIG. 2 and the positions marked D denote dwell position where there is no movement of the cam follower and the R positions represent rises where the cam follower moves from one dwell position to another. TR represents the greatest movement capable of the cam follower which in the present exemplary embodiment is 15 mm over 12 dwell positions. Because of the expansion factor related to the distance of light projected, very small differences in dwell positions on the cam have a multiplied effect when projected. This is shown in FIG. 3 where the transparency 104 is shown vertically in solid lines and in a pivoted position 104' in broken lines, there being assumed to be only three slit apertures in this figure which are indicated as being applied to a planar object 150, the light beams being indicated by lines 118.

Figure 4:
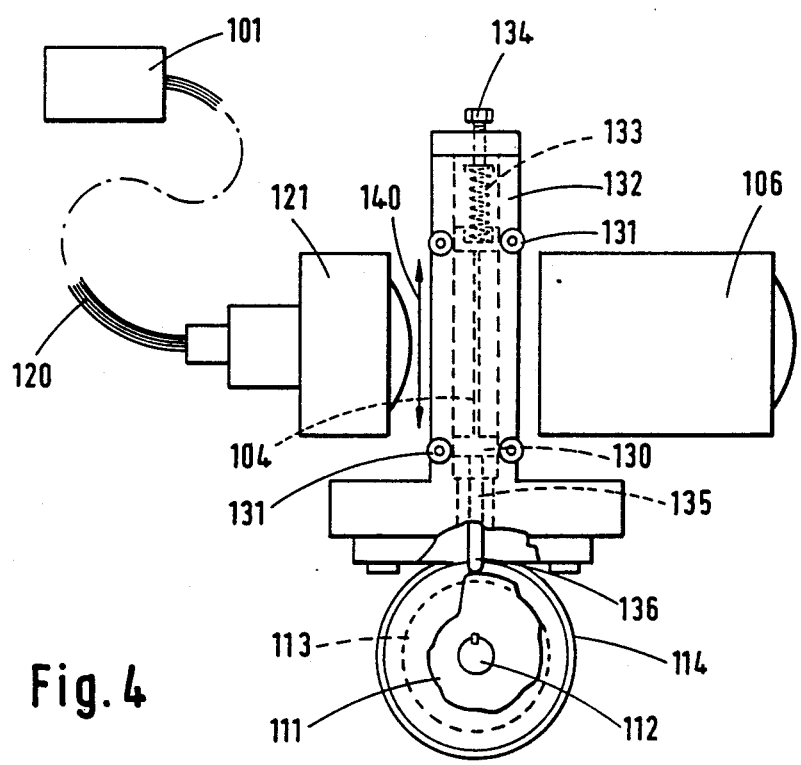

A further embodiment of the projection apparatus, principally intended for industrial use, is shown in FIG. 4 in which the strobe light source 101 is connected by a fibre optic cable 120 to a lens 121. The transparency 104 is mounted in a rectangular holder 130 which is reciprocally located between four low friction rollers 131 mounted in a guide base 132. The rollers 131 permit the holder 130 to be moved in a vertical direction only without play in other directions. A compression spring 133 having a pressure adjuster 134 biasses the holder 130 into contact with a cam follower 135 having a bearing surface 136 in contact with the profile of the cam 111. The light sensor 115 and controller 116 are not shown in the FIG. 4 for clarity.

The cam follower bearing surface 112 is located directly above (in FIG. 4) the axis of the cam 111.

In operation, rotation of the cam 111 moves the holder 130 and hence transparency 104 vertically in the direction of double arrow-headed line 140 and at each dwell position the strobed light source fires to illuminate the object (not shown) through however many slit apertures that are provided on the transparency. It will therefore be understood that at each rise position the slit pattern is progressively moved so that lines of light progressively move across the object.

Although the apparatus shown in FIG. 4 moves in a vertical direction it will be appreciated that by tilting the arrangement through 90° the transparency would be arranged to move in a horizontal direction and it will moreover be appreciated that by so tilting a single transparency a crossing grid of lines of light may be recorded as illuminating an object.

Figure 5:
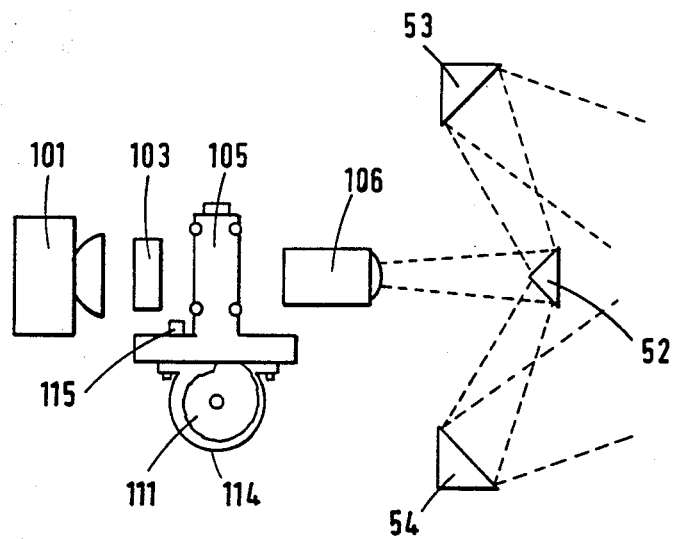
FIG. 5 shows a side view of the apparatus of FIG. 1 used as a part of the scanner disclosed in our aforesaid co-pending U.S. patent application No. 284,251.

Referring to FIG. 5, the apparatus shown in FIG. 1 is shown located in the scanning apparatus of our copending U.S. patent application No. 234,251 incorporated herein by reference. In this respect the projection apparatus of this invention replaces the prism 46 and stepping motor 47 shown in FIG. 8(b) of our said copending application. Thus the projection apparatus of this invention is arranged to project light radiation onto a beam splitter 52 which transmit light into opposing paths (shown in FIG. 5 as upper and lower paths) onto an upper reflective 53 and a lower reflective 54. Thus the upper and lower parts of an object are simultaneously illuminated each with a plurality of slits of light such that re-entrant portions of the object are illuminated.

Figure 6:
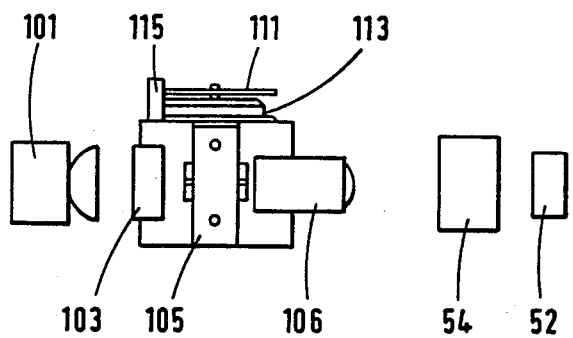
FIG. 6 shows, in similar manner to FIG. 5, the apparatus of FIG. 1 as part of the scanner of our said co-pending application but in another projection configuration.

In the arrangement of FIG. 6 the apparatus is configured for horizontal movement so that patterns of light are projected from the left and right of an object.

The apparatus described herein has the following advantages:

1. Only one transparency pattern master is used, which can be duplicated for any number of pattern projection units in a recording system.

2. Because only one pattern is used, and the movement to the next position for recording is the same pattern, errors likely to occur between different patterns are eliminated.

3. The cam dwells ensure that the pattern is stationary for a fraction of a micro second while the strobe fires and the camera records; this happens irrespective of the motor speed but, obviously the higher the speed, the less is the dwell time and no movement of the pattern is occuring.

4. The devices are simple, small in size, and infinitely variable with cam changes, and/or transparency changes.

5. Manufacture is also relatively simple, while some precision is required in the positioning, cam manufacture, play elimination of pivot or the slide, these are features small precision engineering workshops can readily produce.

The projection apparatus described above provides illumination of a plurality of profiles from one pattern transparency, with the dwells on the cam providing momentary non-movement of the transparency so that clear projection and positioning of the pattern upon an object is achieved.

However, in circumstances where a plurality of the projection apparatuses are in use in one recording assembly there may be overlap of pattern projections from more than one apparatus. Such an overlap of pattern projections is unacceptable because a sensing means, for example a charge coupled device, would not be able to sense clearly defined line edges. Although strobed lights could be used suitably timed, such strobe lights have capacitor build-up time requirements which because of high energy discharges can interfere with charge coupled device signals.

Figure 7:
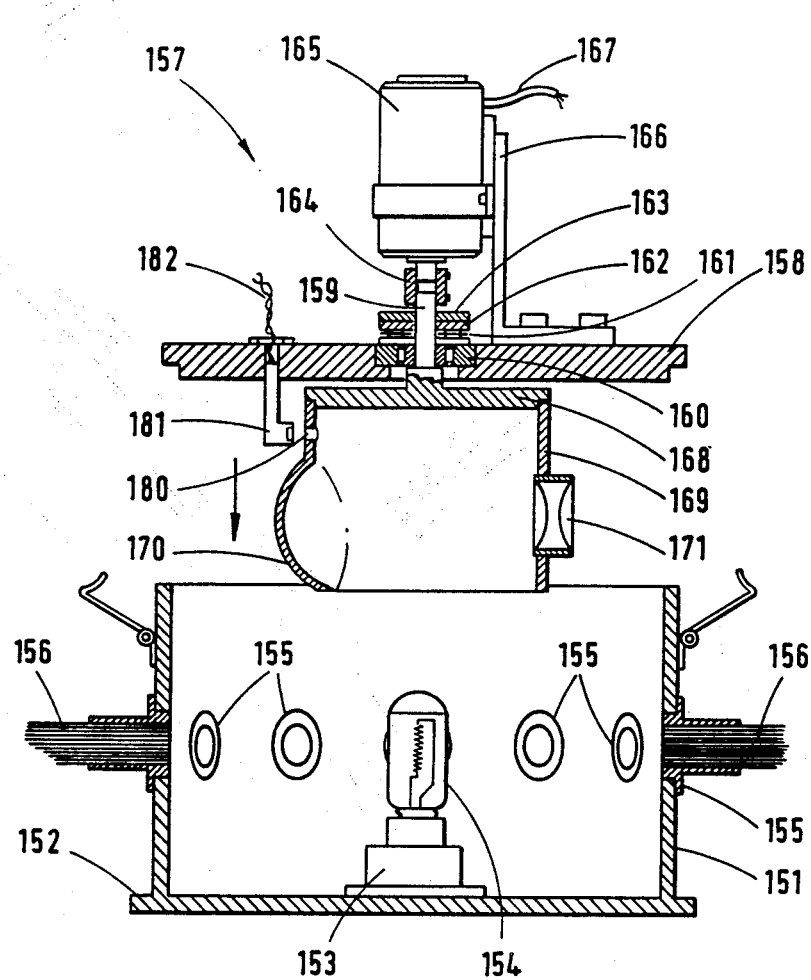
FIG. 7 shows an exploded, partially sectioned, side view of a sequencing device for a plurality of projection apparatuses each in accordance with this invention.

A sequencing device shown in FIG. 7 has a circularly crosssectioned housing 151 having a base plate 152. Mounted on the base plate 152 is a lamp holder 153 for a D.C. lamp 154. The D.C. lamp may be halogen or some other convenient type having direct current to provide consistent output light levels, with an illumination of approximately five (5) million lux. The lamp holder is situated on the diametrical centre of the housing 151 and located in the peripheral wall of the housing at the height of the lamp and in a common plane are twelve equicircumferentially spaced mounting tubes 155 into each of which are secured fibre optic cables 156. Each group of fibre optic cables lead to the projection lens, for example 121, of a projection apparatus. There may be provided cooling apertures (not shown) in the circumferential wall of the housing 151 to permit heat dissipation from the lamp and a cooling fan (not shown) may be supplied if required.

A lid assembly 157 is shown in a raised position over the housing but in use the lid assembly would be positioned such that a lid 158 is located on top of the housing 151. In the diametric centre of the lid and extending downwardly therethrough is a shaft 159 located in a roller bearing 160 and a thrust bearing 161. The shaft has a screw adjusting collar 162 to reduce play in the bearings and a further locking collar 163 is provided on top of the adjusting collar 162. The upper end of the shaft 159 is connected by a coupling 164 to a drive motor 165, the motor being supported by a bracket 166 and having a power supply cable 167. The lower end of the shaft 159 is connected to a stub 168, the stub supporting a reflector 169 having a radial rear portion 170 and including a condenser lens 171 in an opposed surface of the reflector to the radial area 170. The condenser lens and the radial portion of the reflector are arranged to be interposed between the lamp 154 and the fibre optic cables 156.

An aperture 180 is provided in a wall of the reflector and positioned to be in alignment with the aperture 180 is a photodetector 181 located to be stationarily secured to the lid. The photodetector 181 has an output cable 182 for synchonising the rotation of the lens 171 with a charge coupled device sensing unit and can also be used in conjunction with the similar signals derived by the light sensor assembly 115 of the projection apparatus. Thus the photodetector 181 acts as a synchonising device. In operation the motor 165 rotates shaft 159 and hence the stub 168 to thereby rotate the condenser lense 171 about the lamp 154. Light is thus projected to each of the fibre optic cables 156 in turn so that each of the twelve projection apparatuses connected to a respective fibre optic cable illuminates an object.

If, as in the present example, twelve projection apparatuses are used, they are positioned equi-circumferentially about an object. Starting from a datum position the projection apparatuses could be numbered 1 to 12. The fibre optic cables positioned circumferentially around the housing could be numbered from a datum 12, 6, 11, 5, 10, 4, 9, 3, 8, 2, 7, 1, or any other desirable order so that by such an arrangement opposing projection apparatuses will be illuminated in turn. It will therefore be understood that a very large number of patterns may be projected on to an object without the patterns overlapping with one another.

I claim:

1. A projection apparatus for illuminating a plurality of profiles of an object including radiant energy means adapted to project a beam of radiation through means defining a slit aperture, a holder for supporting said means defining said slit aperture and a cam means having a plurality of different dwell positions thereon arranged to drive the means defining the slit aperture across the path of the radiant energy means whereby differing portions of an object may be successively illuminated.

2. An apparatus as claimed in claim 1 wherein the means defining a slit aperture is provided on a transparency.

3. An apparatus as claimed in claim 2 wherein the radiant energy means is a light means, the transparency has a plurality of slit apertures provided thereon and said cam means moves said transparency with respect to the light means.

4. An apparatus as claimed in claim 1 wherein the holder is mounted on a pivot and arranged to be driven arcuately about said pivot by a cam follower engageable with said cam means.

5. An apparatus as claimed in claim 1 wherein the holder is slidably mounted for transverse movement across the projected light beam and arranged to be driven in a reciprocle fashion by a cam follower engageable with said cam means.

6. An apparatus as claimed in claim 3 wherein the light means is a strobe light source and a timing means is provided to ensure the strobe light source fires at each dwell position of said cam means.

7. An apparatus as claimed in claim 1 wherein a plurality of said projection apparatuses are provided for circumferential location about an object and a sequencing means is provided for providing said radiant energy to each projection apparatus in a predetermined sequence.

8. An apparatus as claimed in claim 7 wherein said sequencing means comprises a housing in which is located said radiant energy means and a means for sequentially applying said radiant energy to a plurality of radiant energy transmitting means spaced around said housing, said radiant energy transmitting means coupling with a lens of each projection apparatus, said sequencing means further including a sensing means for synchronising the sequentially applying means with detector means for detecting when said dwell means momentarily holds the means defining a slit aperture stationary on a predetermined projection apparatus.

9. A projection apparatus for illuminating a plurality of profiles of an object including a light means adapted to project a beam of light through a plurality of split apertures provided on a transparency, a holder supporting said transparency and a rotatable cam having a plurality of different radial dwell positions thereon arranged to drive the slit apertures across the path of the light beam whereby differing portions of an object may be successively illuminated.

10. An apparatus as claimed in claim 9 wherein the holder is mounted on a pivot and arranged to be driven arcuately about said pivot by a cam follower engageable with said rotatable cam.

11. An apparatus as claimed in claim 9 wherein the holder is slidably mounted for transverse movement across the projected light beam and arranged to be driven in a reciprocal fashion by a cam follower engageable with said rotatable cam.

12. An apparatus as claimed in claim 9 wherein the light means is a strobe light source and a timing means is provided to ensure the strobe light source fires at each dwell position of said cam.

13. An apparatus as claimed in claim 9 wherein a plurality of said projection apparatuses are provided for circumferential location about an object and a sequencing means is provided for providing said radiant energy to each projection apparatus in a predetermined sequence.

14. An apparatus as claimed in claim 13 wherein said sequencing means comprises a housing in which is located said light means and a means for sequentially applying said radiant energy to a plurality of light transmitting means spaced around said housing, said light transmitting means coupling with a lens of each projection apparatus, said sequencing means further including a sensing means for synchronising the sequentially applying means with detector means for detecting when said dwell means momentarily holds the slit aperture stationary on a predetermined projection apparatus.

* * * * *